United States Patent Office 3,786,001
Patented Jan. 15, 1974

3,786,001
REFORMING CATALYST AND PREPARATION
Edward B. Cornelius, Swarthmore, and George B. De La Mater, Media, Pa., David W. Koester, Wilmington, Del., and James E. McEvoy, Springfield, Pa., assignors to Air Products and Chemicals, Inc., Philadelphia, Pa.
No Drawing. Filed June 21, 1971, Ser. No. 155,224
Int. Cl. B01j 11/12
U.S. Cl. 252—464     6 Claims

ABSTRACT OF THE DISCLOSURE

Hydrated alumina gel, having a small amount of Group V–B metal oxide uniformly distributed therein, is calcined, leached with acetic acid, recalcined, humidified, and impregnated with a Group VIII noble-metal-containing composition. Reductive treatment of such material to provide supported metallic Group VIII noble metal results in highly active, stable, hard reforming catalyst having very low bulk density.

BACKGROUND OF THE INVENTION

(1) Field of the invention

The field of this invention is catalyst consisting predominantly of alumina modified by a small amount of an oxide of a metal of Group V–B of the Periodic Table and having associated herewith a noble metal of Group VIII of the Periodic Table.

(2) Description of the prior art

While the reforming art is only a segment of the general field concerned with treatment of various oils, it is in itself such an extensive segment that art concerned therewith is far too voluminous to consider listing in any approach to completeness. On a selective basis upon review of the Patent Office class 252, subclass 464, some pertinent art appears in U.S. Pats. 2,313,162 to Morrell et al.; 2,415,878 to Hale; and 3,269,958 to Batsis. Other related patents include U.S. 2,723,947; 2,769,688 and 3,467,602. The catalyst of the present invention is prepared by method differing from any of the art-taught methods and has attributes and characteristics differing from and advantageous over catalysts previously available.

SUMMARY OF THE INVENTION

According to this invention new and improved reforming catalyst is prepared by a process comprising, forming a homogeneous admixture of an oxide of a metal of Group V–B of the Periodic Table in an amount in the range of 0.05 to 0.5% by weight, based on the weight of the final catalyst, with hydrated alumina gel characterized in having hydrate water in the range of 20 to 30 weight percent and preferably 20 to 27.5 weight percent, detectable crystallinity of alumina monohydrate by standard X-ray diffraction exposure, a total analyzable content of iron, chlorine and sodium less than 0.07% by weight, and developing upon calcination at 1100° F. for two hours surface area of at least 250 square meters per gram; dehydrating and calcining the admixture to a support with a state of less than 3% by weight of volatiles as measurable by ignition loss value upon ignition at 1400° F. for 2 hours, and to a surface area state of less than 250 square meters per gram but greater than 200 square meters per gram and to a state of crystallinity in the calcined material comprising chi alumina in a range of 25 to 50%; acid leaching the calcined material with an aqueous solution of 5 to 15% acetic acid at ambient temperature for 2–6 hours; removing acid and water from the leached material; subjecting the dry material to a second calcination at a temperature in the range of 800–1000° F. for a time of at least 1 hour while maintaining the calcined material from the second calcination with a surface area greater than 200 square meters per gram; cooling the calcined material from the second calcination and humidifying the cooled material to a volatiles content in the range of 7 to 10% by weight; treating the humidified material in an enclosed region to replace with carbon dioxide substantially all other normally gaseous components; introducing into the enclosed region a solution comprising a noble metal component of Group VIII of the Periodic Table, said solution being in an amount sufficient to completely impregnate said humidified and $CO_2$ environmentalized material and having said Group VIII noble metal component in an amount equivalent to 0.2 to 1.5 weight percent as metal based on the weight of the final catalyst; impregnating said humidified and $CO_2$ environmentalized material; withdrawing the impregnated material from the enclosed region; drying said impregnated material containing said Group VIII noble metal component to a volatile content of less than 10% by weight; calcining said last mentioned dry material at a temperature in the range of 800 to 1000° F. for a time in the range of 1 to 6 hours in a flowing stream of dry air; converting the Group VIII nobel metal component to metal deposited in and on the alumina-Group V–B oxide support; and recovering as product an active reforming catalyst having a bulk density of less than 0.55 kilogram per liter.

It is important to the successful culmination of preparation to the catalyst of this invention to observe the order of preparative steps as well as to follow the instructions as to ingredients and treating steps. Thus admixture of the Group V–B metal oxide with the alumina precursor hydrated gel is prior to the first calcination step; also the leaching of the calcined material from the first calcination is required prior to incorporation of the Group VIII noble metal component.

The major component of the catalyst is alumina in a particular state partly characterized above in precursor and developed state; and further characterized in that the final catalyst has physical characteristics, mainly attributable to the major component, i.e., alumina, as having an X-ray diffraction pattern indicative, in addition to the above-noted 25–50% chi-type crystallinity, of at least 90% of the balance of crystallinity identifiable as gamma and with a total eta crystallinity of less than 5%. In the final product, also, total pore volume is in the order of 0.85 to 1.1 cubic centimeters per gram and with pore size distribution of greater than 85% in the range of 50 to 150 A. in diameter.

An advantageous feature in connection with the use of the hydrated alumina gel as above-defined and with the Group V–B oxide additive present is the unusual possibility whereby with the addition of water alone in proper amount to provide upon mulling an extrudable consistency, the mulled material can be extruded readily, as in an auger extruder, to form pellets or the like which upon calcination have an unusual degree of hardness such as in the order of 8 pounds crushing strength or higher and are also practically immune to decrepitation upon rewetting with water.

With respect to the Group VIII noble metal component no particular novelty is urged as to either its composition, the method of incorporation or in its conversion to metallic form. Generally, chloroplatinic acid and the water soluble salts of the Group VIII noble metals may be employed in preparation of an aqueous impregnating solution.

A clearer understanding of the nature of the invention may be obtained through consideration of the examples appearing hereinafter as illustrative of preferred, although not of necessity limiting, embodiments.

DESCRIPTION OF PREFERRED EMBODIMENTS

EXAMPLE I

An intimate homogeneous admixture of hydrated alumina gel and niobium oxide was prepared in a Patterson-Kelley V-Blender, equipped with an intensifier, from a charge of 1000 parts of gel alumina powder, available as Kaiser KCSA, and 2.73 parts of $Nb_2O_5$, screened through 200 mesh, available as purified grade, Code 4627, from Mallinckrodt. The properties of the gel alumina included:

| | |
|---|---|
| Bulk density, lb./ft.$^3$, loose | 18.8 |
| Ignition loss at 1000° C. for one (1) hour, percent | 22.4 |
| Average particle size, $\mu$ | 50–60 |
| Na-Fe-Cl content, percent | 0.02 |
| Surface area (BET after calcining for 2 hours, 1100° F.), m.$^2$/g. | 256 |
| Pore volume (calcined for 2 hours, 1100° F.) (100,000 p.s.i.g. Hg), cc./g. | 0.98 |

The blended mixture was diluted with an additional 4000 parts of the gel alumina and thoroughly admixed by quasi fluidization, i.e., aerated agitation.

The admixture was converted to an extrudable state by mulling, in a scraper-equipped Lancaster mixer, for 33 minutes with 5800 parts of deionized water. The mulled material was transferred to a Welding Engineers auger extruder equipped with reducing pitch worm. The die plate on the extruder had 1/16 inch diameter holes. The mulled material was extruded at 95–105 indicated torque, using water cooling for the barrel, in 18 minutes. The extruded strands were doctor-blade severed at approximately 1/4 inch intervals forming pellets of high green strength and nonadhesive to each other.

The green pellets were dried in a Proctor and Schwartz oven at 250° F. for 2 hours with through-circulation of air. The dried pellets were placed in a furnace and calcined at 1050° F. for 2 hours in a through flow of bone dry air. The thus calcined pellets had properties including.

| | |
|---|---|
| Bulk density (packed) | 29.3 lbs./ft.$^3$ (0.47 kg./l.) |
| Crushing strength, lbs., avg. | 14. |
| Surface area (BET) | 232. |
| Total pore volume | 0.97 cc./g. |
| Alumina phases (X-ray): | |
| Eta | <5%. |
| Gamma | ~60%. |
| Chi | ~35+%. |

Of the calcined pellets, 1750 parts by weight (approximate) were acid treated with an excess of an aqueous solution of acetic acid (containing by concentration 10% HOAC) by immersion for 2 treatments, each of 1-hour duration. The acid treated pellets were washed 5 successive times with demineralized water, each wash involving total immersion in an excess of the wash water and the water drained after 20 minutes immersion.

The washed pellets were thoroughly drained, heated in warm air for 120 minutes to remove superficial moisture and then heated at 900° F. for 2 hours in bone dry flowing air. This treatment was followed by a humidification treatment at 250° F. for 2 hours in a flowing atmosphere of 50:50 $H_2O$ vapor:air. The humidified pellets, containing about 8.2% by weight volatile matter, were thereafter prepared for incorporation of platinum.

The impregnating solution was a portion of a stock solution containing 0.1134 g. of Pt per cubic centimeter on the basis of the amount of chloroplatinic acid dissolved in water. The portion of this stock solution was 28 cc. which was further diluted to a volume of 350 cc. with demineralized water. 375 g. of the humidified pellets were placed in a suction flask and evacuated. The vacuum was broken with $CO_2$ to a slight positive $CO_2$ pressure. The evacuation and pressurizing with $CO_2$ was repeated 3 more times. The impregnating solution was added to the flask while the $CO_2$ atmosphere was maintained. The flask contents were agitated initially and at 20 minute intervals during a 3 hour period at ambient temperature. The amount of solution employed was sufficient to uniformly distribute throughout the pellets with substantially no liquid excess.

The impregnated pellets were then oven dried in the Proctor and Schwartz oven at 220° F. for 2 hours while supported on cloth and with through flow of air.

The dried pellets were then calcined at 900° F. for 2 hours in flowing bone dry air to form are forming catalyst material.

EXAMPLE II

The effect of alumina supports among other things was determined by comparing the reforming catalyst prepared in Example I as Sample A; catalysts containing platinum and derived from two different commercially available low density aluminaceous materials as Samples B and C, and a third standard density Pt on $Al_2O_3$ bead commercial catalyst as Sample D. While the percent by weight of platinum on the several catalyst samples varied to a small degree, the differences in the densities of the catalysts were such as to provide in the reaction zone in each instance approximately similar total weights of platinum. The comparison is presented in Table 1.

TABLE 1

| Sample | A | B | C | D |
|---|---|---|---|---|
| Catalyst | Example I | Pt on low density $Al_2O_3$ | Pt on low density $Al_2O_3$ [c] | Pt on standard density $Al_2O_3$ beads |
| Bulk density, kg./l. | 0.47 | 0.66 | 0.69 | |
| Ignition loss (percent), 1 hr. at 1,400° F | ~3 | ~3 | ~3 | ~3 |
| Combined Fe–Cl–Na, wt. percent | 0.02 [a] | 0.05 [a] | 0.10 [a] | 0.8+ [b] |
| Surface area, m.$^2$/g | 232 | 159 | 250 | 170 |
| Crushing strength, lbs./mm | 2.4 | 1.5 | 0.8 | |
| X-ray crystallinity of crystalline alumina: | | | | |
| Percent eta | <5 | 0 | ~20 | 0 |
| Percent gamma | ~60 | >90 | <70 | >95 |
| Percent chi | ~35 | <10 | <20 | <5 |
| Pore volume, cc./g | 0.97 | 0.81 | ~0.8 | .91 |
| Activity, reforming low sulfur (1 p.p.m.) Kuwait naphtha to constant 91 O.N.: | | | | |

| | Temp., °F. | Yield, wt. percent | Temp., °F. | Yield, wt. percent | Temp., °F. | Yield, wt. percent | Temp., °F. | Yield, wt. percent |
|---|---|---|---|---|---|---|---|---|
| Start | 895 | 88 | 880 | 88 | 870 | 88 | 890 | 88 |
| 50 hours | 905 | 88 | 895 | 87 | 890 | 87 | 925 | 86 |
| 100 hours | 910 | 87 | 920 | 84 | 920 | 83.5 | 1,000 | 80 |
| 200 hours | 930 | 86 | 990 | 81 | 920 | 80.5 | (Off scale) | |
| 300 hours | 975 | 82.5 | (Off scale) | | (Off scale) | | | |

[a] Support.
[b] Complete catalyst.
[c] Described in 3,467,602.

From the above data it is apparent that the nature of the catalyst of Example I has excellent activity and stability; and that the aluminaceous materials employed as supports have a definite bearing on the quality of the final catalyst, that the pellet hardness differs markedly, and that such difference shows the advantage of the catalyst material of Example I.

EXAMPLE III

An alumina hydrate is prepared by precipitation from a solution of 300 g. of aluminum chloride ($AlCl_3 \cdot 6H_2O$) in 3 liters of water by addition of an ammoniacal solution of 252 ml. of concentrated (28%) $NH_4OH$ diluted with water to a volume of 435 ml. The addition of the ammoniacal solution is effected with vigorous stirring and the final mixture is adjusted to a pH of 8.0. The mixture, after standing overnight at room temperature, is heated to 130° C. and maintained for 20 hours at temperature to provide an aged alumina hydrate. The aged precipitate is separated from the mother liquor by filtration and washed repeatedly until the wash water shows freedom from chloride in the silver nitrate test.

Analysis of the washed and dried precipitate shows a water of hydration value of about 24.6% along with a predominantly gamma-type alumina structure. The pore volume after calcination at 950° F. for 2 hours in flowing dry air is 0.87 cc./g. with pore size distribution in the 50–100 A. range of more than 50%.

Tests show this alumina hydrate is acceptable precursor material when combined with niobium oxide, calcined, leached, calcined and impregnated with platinum to provide reforming catalyst in a manner similar to the preparation method described in Example I.

EXAMPLE IV

A catalyst composition is prepared as in Example I, with the exception that vanadium oxide is employed as the additive in the alumina gel, replacing a similar weight percent of niobium oxide. The final catalyst shows similar physical characteristics to those of the catalyst product of Example I. Upon testing as a reforming catalyst results are somewhat similar to those observed with the catalyst of Example I and exhibit a tendency to provide a reformate of slightly lower yield but with slightly higher olefinicity which reflects in a slightly higher octane number when the reforming test is effected at conditions comparable to those reported in Example V.

EXAMPLE V

Two catalyst samples (E and F, respectively), were prepared as in Example I except that no Group V-B component was employed and that one of the samples was not acid leached, dried and calcined prior to humidification and incorporation of the platinum component. A further catalyst (Sample C) substantially identical with that prepared in Example I, was employed in reforming tests and compared to Samples E and F likewise tested under similar conditions. The test was conducted under deliberately selected conditions providing a similitude of results to be expected under commercial operation within a highly foreshortened time period. The results appear in Table 2 with the test conditions in all instances adjusted temperature-wise to obtain product reformate of substantially constant 91 octane number. The charge stock was Kuwait naphtha, with an octane number of 32 F-1 clear, the operating pressure was 150 p.s.i.g., the space rate was 3.5 LHSV, and the hydrogen to oil ratio was 4 to 1.

TABLE 2

| | Initial temperature | Temperature after processing at the rate of— | |
|---|---|---|---|
| | | 1 bbl./lb. of catalyst | 2 bbl./lb. of catalyst |
| Sample E (no Group V-B component) (no acetic acid leach). | 935° F. | 1,010° F. | (Off scale.) |
| Sample F (acetic acid leached) (no Group V-B component). | 915° F. | 950° F. | 1,020° F. |
| Sample G Catalyst as in Example I (acetic acid leached; Group V-B component). | 910° F. | 940° F. | 980° F. |

The catalyst, as in Example I, is likewise more stable as shown when the above-described testing was continued to processing at the equivalent of two barrels of feed per pound of catalyst which showed that for Sample F a temperature above 1000° F., i.e., about 1020° F., was required to obtain 91 O.N. product whereas for the catalyst of Example I (Sample G) the temperature required to obtain 91 O.N. was about 980° F. Such showing of catalyst stability is definitely advantageouse in that commercial operations with catalysts of the present invention can have appreciably longer on-stream times thereby reducing operating costs in a lower frequency of refinery downtime in the reforming operation.

EXAMPLE VI

Employing the same type of reforming test as in Example V, above, except that the charge stock was a commercial low octane (49 F-1 clear), high sulfur (20 p.p.m.) mid-continent naphtha, the same type catalyst as Sample G of Example V was compared with the commercially available low-density catalyst as employed as Sample C in Table 1.

TABLE 3

| Temperature, ° F. | Initial | 1 bbl./lb. | 2 bbl./lb. | 2.5 bbl./lb. | 9 bbl./lb. |
|---|---|---|---|---|---|
| Sample C | 845 | 885 | 960 | 1,010 | |
| Sample G | 905 | 905 | 910 | 915 | 985 |

The striking quality of catalyst longevity is clearly evident for catalyst prepared in accordance with this invention. In addition to the evidenced stability with respect to temperature requirements necessary to obtain a substantially constant 93 O.N., there is the important quality evidenced in liquid recovery during the above-described test as shown in Table 4.

TABLE 4

| Liquid recovery wt. percent at 93 O.N. | Initial | 1 bbl./lb. | 2 bbl./lb. | 2.5 bbl./lb. | 9 bbl./lb. |
|---|---|---|---|---|---|
| Sample C | 87.5 | 87.0 | 84.0 | 82.0 | |
| Sample G | 88.5 | 87.5 | 88.0 | 88.0 | 82.0 |

Obviously, many modifications and variations of the invention as hereinbefore set forth may be made without departing from the spirit and scope thereof, and therefore only such limitations should be imposed as are indicated in the appended claims.

What is claimed is:

1. In a method for the preparation of reforming catalyst of the type in which a Group VIII noble metal is supported on a porous, predominantly aluminaceous carrier, said preparation including the steps of employing as the carrier porous, high surface area, acetic acid leached predominantly aluminaceous material, impregnating such carrier with a solution comprising the noble metal component thermally decomposable to the metal and converting the noble metal component to the metal substantially uniformly distributed in and on the carrier to provide an active, low-density reforming catalyst, the improvement comprising (a) employing as the alumina source hydrated alumina gel having 20 to 30 wt. percent volatile matter, as measured by ignition at 1400° F. for 2 hours, a surface area after calcination at 1100° F. for 2 hours of above 250 square meters per gram, a total analyzable iron, chlorine and sodium content of less than 0.07 wt. percent on an ignited basis of measurement, and characterized in being convertible in the preparation of the final catalyst to alumina having 25–50% chi-type crystallinity;

(b) admixing said alumina source with an oxide of a metal of Group V-B of the Periodic Table, said oxide being employed in an amount providing 0.05 to 0.5 wt. percent of the final catalyst;

(c) drying and calcining said admixture for time and at elevated temperature to provide the predominantly aluminaceous support having less than 3 wt. percent volatile material removable by ignition at 1400° F. for 2 hours, a surface area of less than 250 square meters per gram but greater than 200 square meters per gram, and X-ray detectable crystallinity of chi-type in an amount in the range of 25 to 50%, less than 5% eta-type and of the balance at least 90% identifiable as gamma type;

(d) acid leaching said calcined support with an aqueous solution containing 5 to 15% acetic acid as the acid for a time period of at least 30 minutes at ambient conditions;

(e) washing and drying the leached support;

(f) subjecting the last-mentioned dried support to a second calcination at a temperature in the range of 800 to 1000° F. for at least 1 hour while maintaining the surface area of the support above 200 square meters per gram;

(g) humidifying the cooled support from the second calcination by treatment at conditions of heat and humidity to impart a volatile material content in the range of 7 to 10 weight percent;

(h) treating the humidified support with carbon dioxide to provide an environment substantially free of other normally gaseous components;

(i) impregnating the $CO_2$ environmentalized support with a solution comprising the Group VIII noble metal component thermally decomposable to the metal in an amount equivalent to 0.2 to 1.5 wt. percent of noble metal based on the weight of the final catalyst;

(j) drying and calcining the impregnated support at a temperature in the range of 800 to 1000° F. for a time in the range of 1 to 6 hours; and (k) converting the noble metal component to the metal distributed in and on the support, providing thereby an active reforming catalyst having a bulk density of less than 0.55 kilogram per liter.

2. The method of preparing reforming catalyst in accordance with claim 1 wherein the Group V–B metal oxide is niobium oxide.

3. The method of preparing reforming catalyst in accordance with claim 2 wherein the Group VIII noble metal is platinum.

4. The method of preparing reforming catalyst in accordance with claim 1 wherein the admixture from step (b) is converted by mulling with added water to an extrudable consistency and extruded as shaped particles and then subjected to step (c).

5. Reforming catalyst prepared in accordance with the method of claim 1.

6. Reforming catalyst of claim 5 characterized in having total pore volume in the range of 0.85 to 1.1 cc./g. and pore size distribution of greater than 50% in the range if 50 to 100 A. in diameter.

References Cited

UNITED STATES PATENTS

| | | | |
|---|---|---|---|
| 3,207,703 | 9/1965 | Innes et al. | 252—464 X |
| 2,406,646 | 8/1946 | Webb et al. | 252—464 X |
| 2,854,404 | 9/1958 | Prater et al. | 252—466 PT |

DANIEL E. WYMAN, Primary Examiner

W. J. SHINE, Assistant Examiner

U.S. Cl. X.R.

252—466 PT